W. REDICK.
Corn Planter.

No. 8,532.

Patented Nov. 18, 1851.

UNITED STATES PATENT OFFICE.

WM. REDICK, OF UNIONTOWN, PENNSYLVANIA.

IMPROVEMENT IN SEED-PLANTERS.

Specification forming part of Letters Patent No. 8,532, dated November 18, 1851.

*To all whom it may concern:*

Be it known that I, WILLIAM REDICK, of Uniontown, in the county of Fayette and State of Pennsylvania, have invented a new and useful Improvement in Corn-Planting Machines; and I do hereby declare the following to be a full, clear, and exact description of the same, reference being had to the accompanying drawings, making a part thereof, in which—

Figure 1:
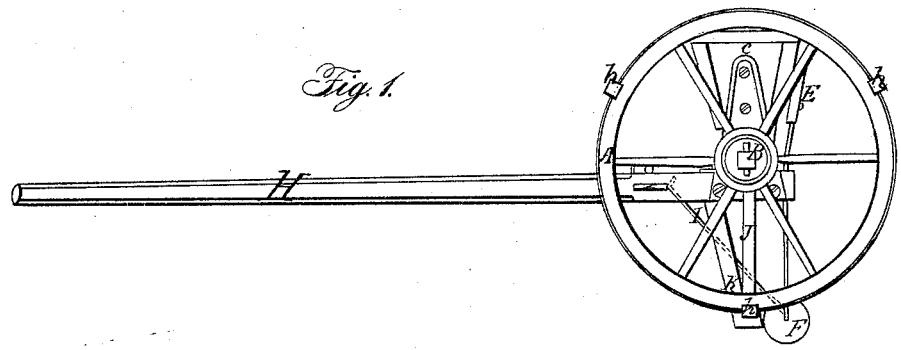
Figure 2:
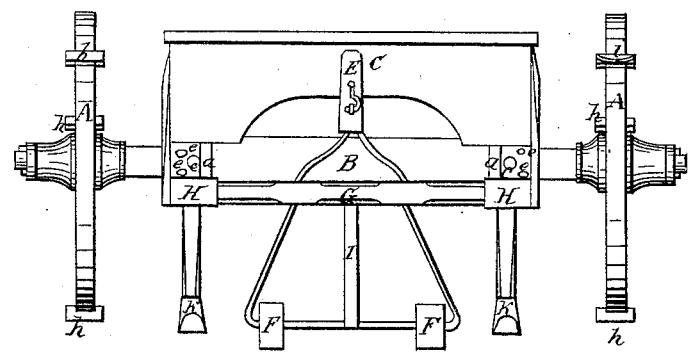

Figure 1 represents a side view. Fig. 2 represents a rear view, and Fig. 3 a transverse section through the center of the hopper and axle.

Similar letters in the several figures denote like parts.

The nature of my invention consists, first, in providing the wheels upon which the machine moves with markers which lay out the ground in advance for the succeeding rows, and with a small truck operated by a lever, upon which the whole machine may rest (it being raised entirely off the ground by said truck) when turning around at the ends of the furrows or in going to or from the field, and also for adjusting the markers, when necessary, to the previously-made marks without stopping the machine or turning the wheels and markers around by hand, as is usually practiced in similar machines; second, in providing the bottom of the hopper or seed-box with movable slats for opening or closing the communication between said hopper or seed-box and the grooves and cells in the axle, which receive and carry around the corn or other seed to be planted and deposit it in the seed-tubes, whence it passes through a shoe into the ground for the triple purpose of planting corn or other seed in "check-rows," "step-rows," or "drilling it in," as may be preferred by the farmer.

To enable others skilled in the art to make and use my invention, I will proceed to describe the same with reference to the drawings.

On a pair of wheels, A, of usual construction, arranged on an axle, B, which has its ends made square and fitting into corresponding square mortises in the hubs, so as to make said axle rotate with said wheels, I place a hopper or seed-box, C, the bottom of which is formed of two inclined planes, D, which slope from the center of said hopper, near the top, toward the ends, where openings are left sufficiently large to span the grooves $a$ and cells $c\,e$ in the axle, which receive and carry the grain to the seeding-tubes as the machine may be required for drilling or for planting in check-rows or step-rows. The openings in the bottom of the seed-box at each end are precisely similar, and are provided with movable slats $f\,g$, which slide in grooves cut in the sides of the seed-box or hopper, said slats being of such width as at all times to afford communication with either the grooves $a$ in the axle, which drill in the grain, and which is thus represented in Fig. 3, or by moving the slats $f$ toward the center of the hopper to close the communication with the grooves and open it with the cells $c$ for planting in check-rows, or by sliding both the slats $f\,g$ toward the center of the hopper or seed-box to close the communication between said box and the grooves $a$ and cells $c$ and open it with the cells $e$ for planting in step-rows.

Great diversity of opinion exists with farmers as to the proper method of planting corn, and many practice all three of the methods herein described, adapting them, however, to peculiar locations and soils. By my arrangement either of the three ways may be practiced by the use of only one machine.

The wheels A are provided with markers $h$, which ordinarily may be a piece of flat oblong iron bolted to the tire or felly of the wheel, and which may be of any number, corresponding, however, exactly with the number of cells, or with divisions of the number of cells, so as to be an index of each deposit of grain; or the markers may be made with a sharp scoop-shaped edge, as represented at $i$ in Fig. 2, where the ground is very hard, so as to scoop out a mark instead of merely pressing on the ground. The markers as here represented correspond in number with the cells $c$ in the axle, and make a mark precisely opposite the grain dropped from each of said cells $c$. When the cells $e$ are used the markers tally only each alternate row, and when drilling in the corn by the grooves $a$ no attention whatever need be given to the markers. When the markers upon the wheels do not match the marks made while planting the previous rows the lever E is thrown up, bringing the whole weight of the seeding-machine (and which is entirely raised off the ground thereby) upon the truck-wheels F, and upon which truck-wheels it is allowed to move until the marker comes over the exact spot, when the lever is pulled down, which lets down the machine and allows it to commence planting again in the proper line. By this arrangement I can plant corn in precise straight lines both ways, so that in cross-plowing the corn in cultivating it there cannot be the slightest danger in overrunning the rows.

Figure 3:
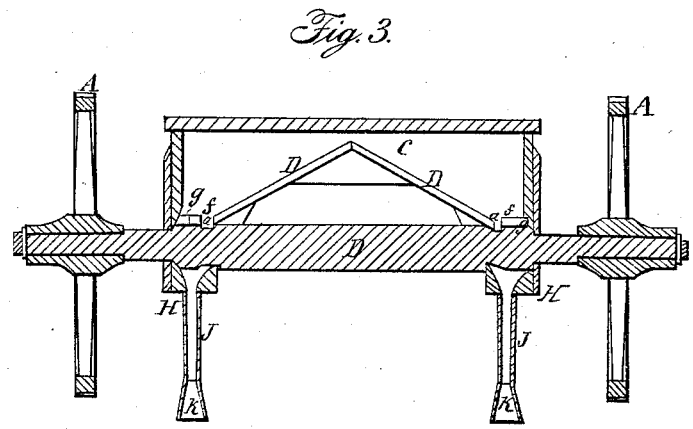

The truck F is supported in a bar, G, which rests on its journals in the rear projections of the shafts H, and upon which journals it may freely turn. When the machine is being moved from field to field, or when not really planting, the lever is thrown up toward the seed-box or hopper and fastened by a hook and staple, as represented, which brings the whole machine onto the truck, said truck being prevented from falling back too far or from pressing or straining against the seed-box by the chain or strap I, which is attached to the axle of the truck, and passes up and is fastened to the brace between the shafts, to which the single-tree is attached in front of the seed-box or hopper. The seeding-tubes J pass up through the shafts, and are provided with funnel-shaped mouths, as represented in Fig. 3, for the purpose of receiving the grain from the grooves $a$ when drilling it in, or either of the rows of cells $c$ $e$, when planting in check-rows or step rows, respectively, as it is brought by them from the hopper. The bottoms of the seeding-tubes pass into and rest in the shoes K, which are suspended from the shafts, and which open the furrows into which the corn drops, the earth closing over it, after the usual manner of drilling other grain. By this arrangement I am able, by means of the slides $f$ $g$, to plant corn or other grain or seeds in three separate ways—viz., by means of the grooves $a$ in drills, by the cells $c$ in check-rows, and by the cells $e$ in step-rows—either being effected by a simple adjustment or movement of the said slides.

Having thus fully described my invention, what I claim therein as new, and desire to secure by Letters Patent, is—

The combination of the slides $f$ $g$ with the grooves $a$ (which drill in the grain) and the cells $c$ $e$, so that by moving the slats $f$ toward the center of the hopper to close the communication with the grooves and open it with the cells $c$ for planting in check-rows, or by moving both the slats $f$ $g$ toward the center of the hopper to close the communication between said hopper and the grooves $a$ and cells $c$ and open it with the cells $e$ for planting in step-rows, the whole being arranged in the manner and for the purpose herein set forth and fully shown.

WM. REDICK.

Witnesses:
J. H. GODDARD,
A. B. STOUGHTON.